US011336747B2

(12) United States Patent
Chan et al.

(10) Patent No.: US 11,336,747 B2
(45) Date of Patent: *May 17, 2022

(54) METHOD AND SYSTEM FOR TRAFFIC MANAGEMENT USING A UNIFIED NETWORK BARRING MECHANISM

(71) Applicant: Verizon Patent and Licensing Inc., Washington, DC (US)

(72) Inventors: Yee Sin Chan, San Jose, CA (US); Jin Yang, Orinda, CA (US); Lei Song, Fremont, CA (US); Ye Huang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/823,902

(22) Filed: Mar. 19, 2020

(65) Prior Publication Data

US 2020/0220946 A1   Jul. 9, 2020

Related U.S. Application Data

(63) Continuation of application No. 15/632,594, filed on Jun. 26, 2017, now Pat. No. 10,637,963.

(51) Int. Cl.
*H04L 67/61* (2022.01)
*H04L 47/80* (2022.01)
*H04L 47/70* (2022.01)
*H04W 28/02* (2009.01)
*H04W 48/06* (2009.01)
*H04W 76/20* (2018.01)

(Continued)

(52) U.S. Cl.
CPC ............ *H04L 67/322* (2013.01); *H04L 47/74* (2013.01); *H04L 47/803* (2013.01); *H04L 47/805* (2013.01); *H04L 47/824* (2013.01); *H04W 28/0289* (2013.01); *H04W 48/06* (2013.01); *H04W 76/20* (2018.02); *H04L 67/14* (2013.01)

(58) Field of Classification Search
CPC ..... H04L 67/332; H04L 47/74; H04L 47/803; H04L 47/805; H04L 47/824; H04W 76/20
See application file for complete search history.

(56) References Cited

U.S. PATENT DOCUMENTS

2016/0278096 A1*  9/2016  Watfa ................ H04W 72/0486
2017/0135028 A1*  5/2017  Lee ....................... H04W 48/06
(Continued)

*Primary Examiner* — Suraj M Joshi

(57) ABSTRACT

A method, a device, and a non-transitory storage medium are provided to store traffic management data that indicates different levels of congestion that are each correlated to a different category of application of an end device, a type of congestion mechanism including at least one of access class barring, enhanced access class barring, service specific access control, application specific congestion control for data communication, or unattended and background data traffic, and barring parameters; receive a request for wireless service; obtain a level of congestion; determine that the request cannot be granted based on the level of congestion; select one of the levels of congestion based on the level of congestion; generate a first barring message based on the type of congestion mechanism, barring parameters, and category of application correlated to the one of the levels of congestion; and transmit the first barring message to the end devices.

20 Claims, 12 Drawing Sheets

(51) Int. Cl.
H04L 47/74 (2022.01)
H04L 67/14 (2022.01)

(56) References Cited

U.S. PATENT DOCUMENTS

2018/0027479 A1* 1/2018 Ahmad ................. H04W 48/12
 370/235
2018/0220356 A1* 8/2018 Tenny ................ H04B 7/15528

* cited by examiner

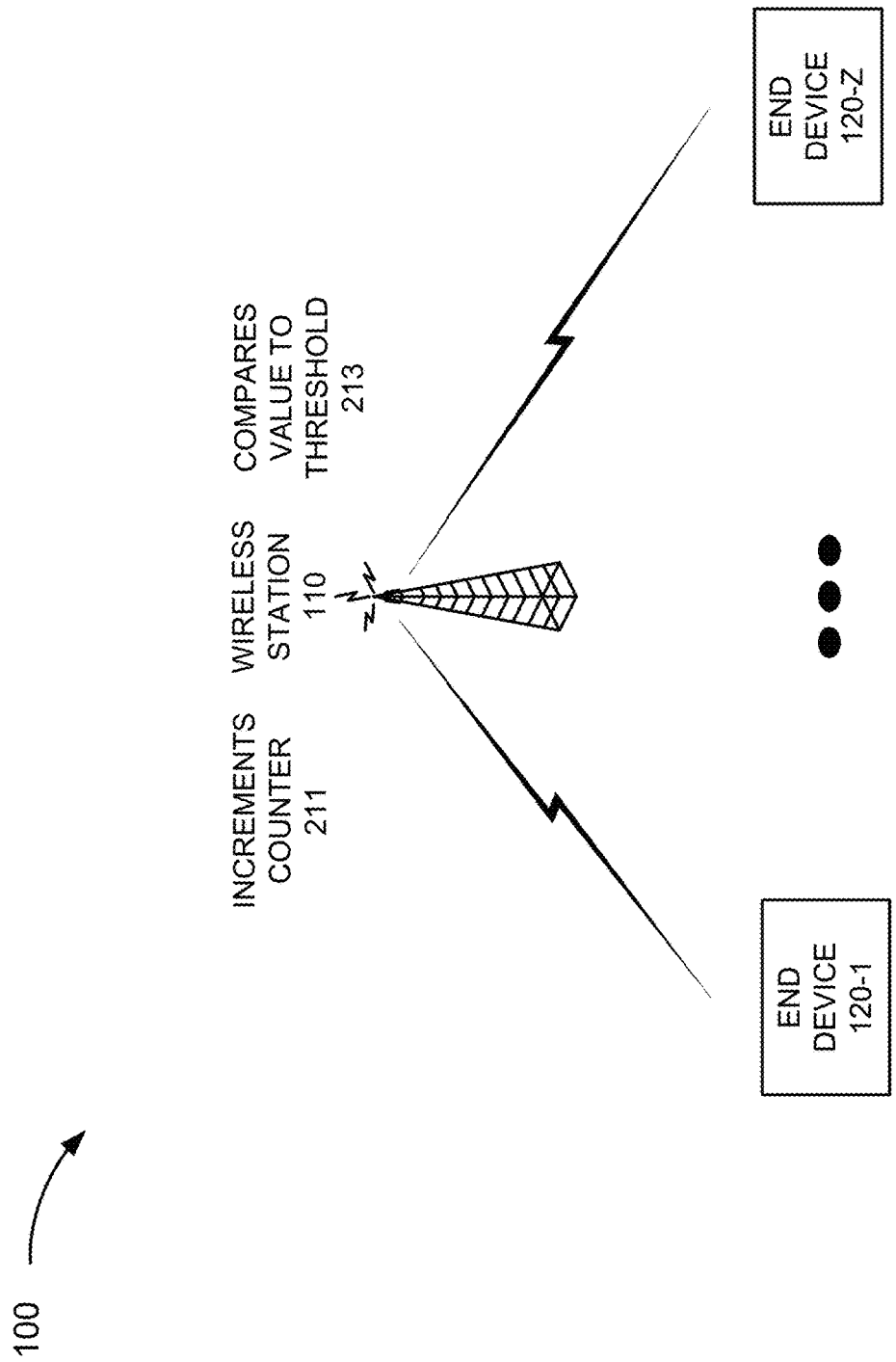

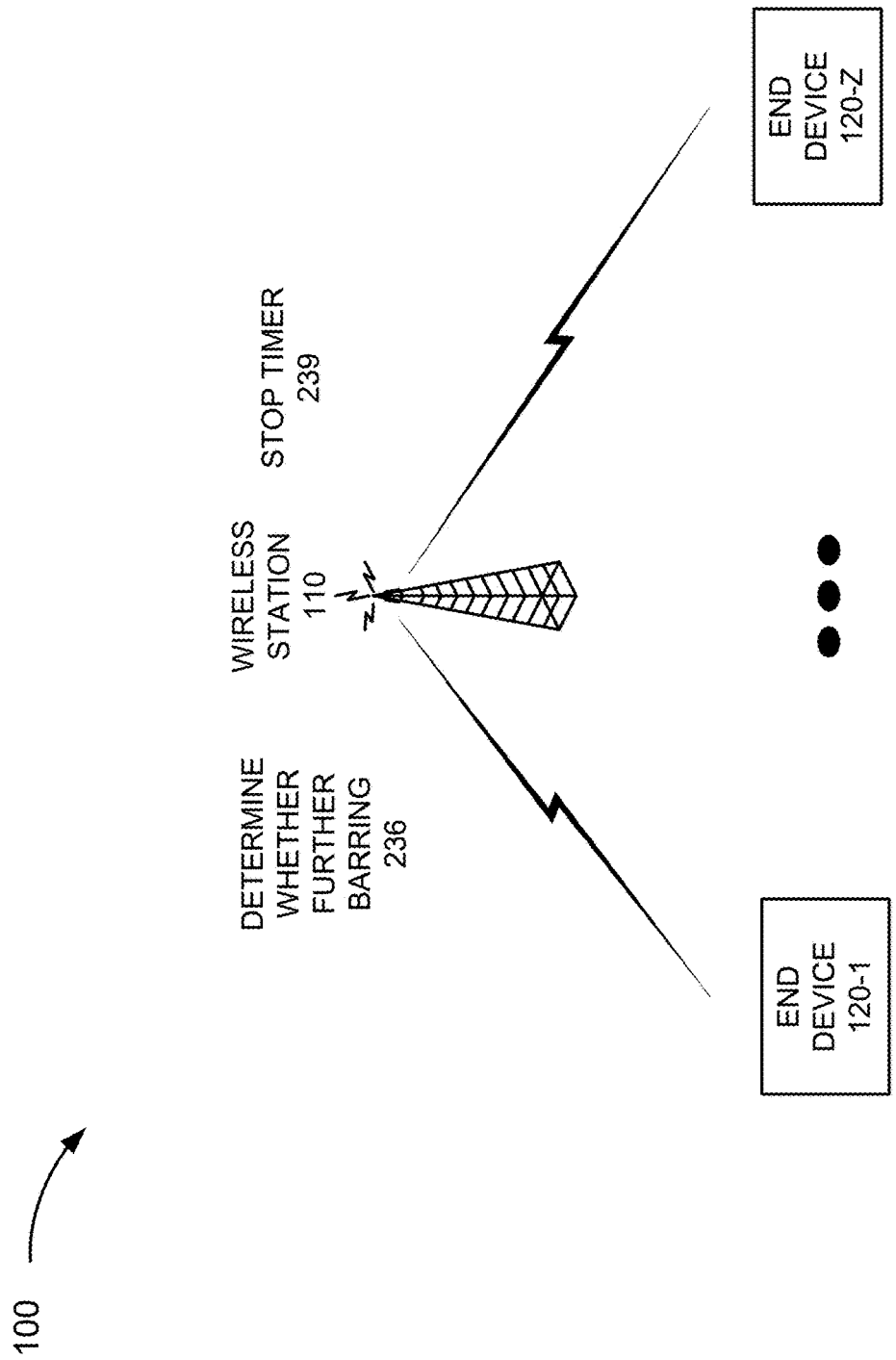

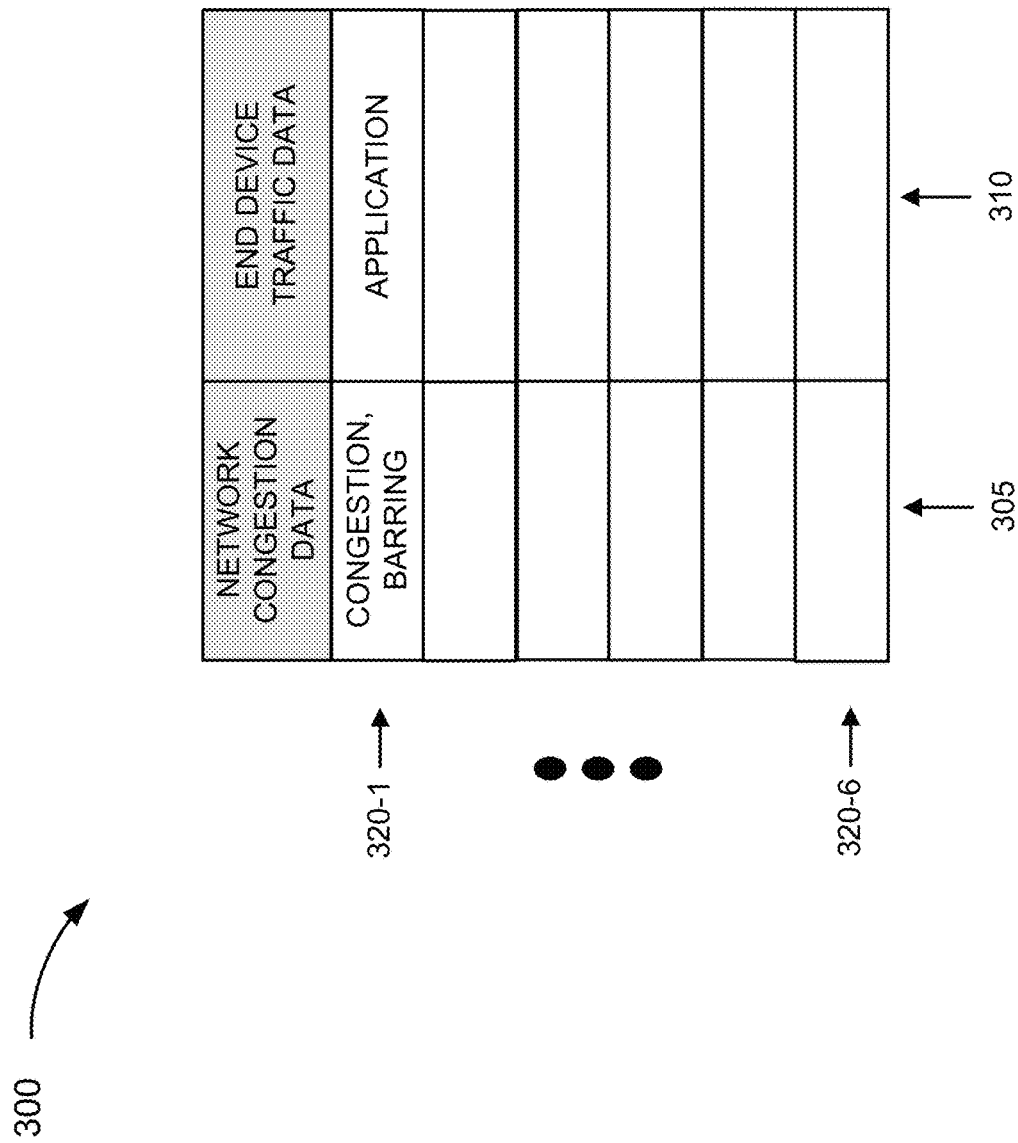

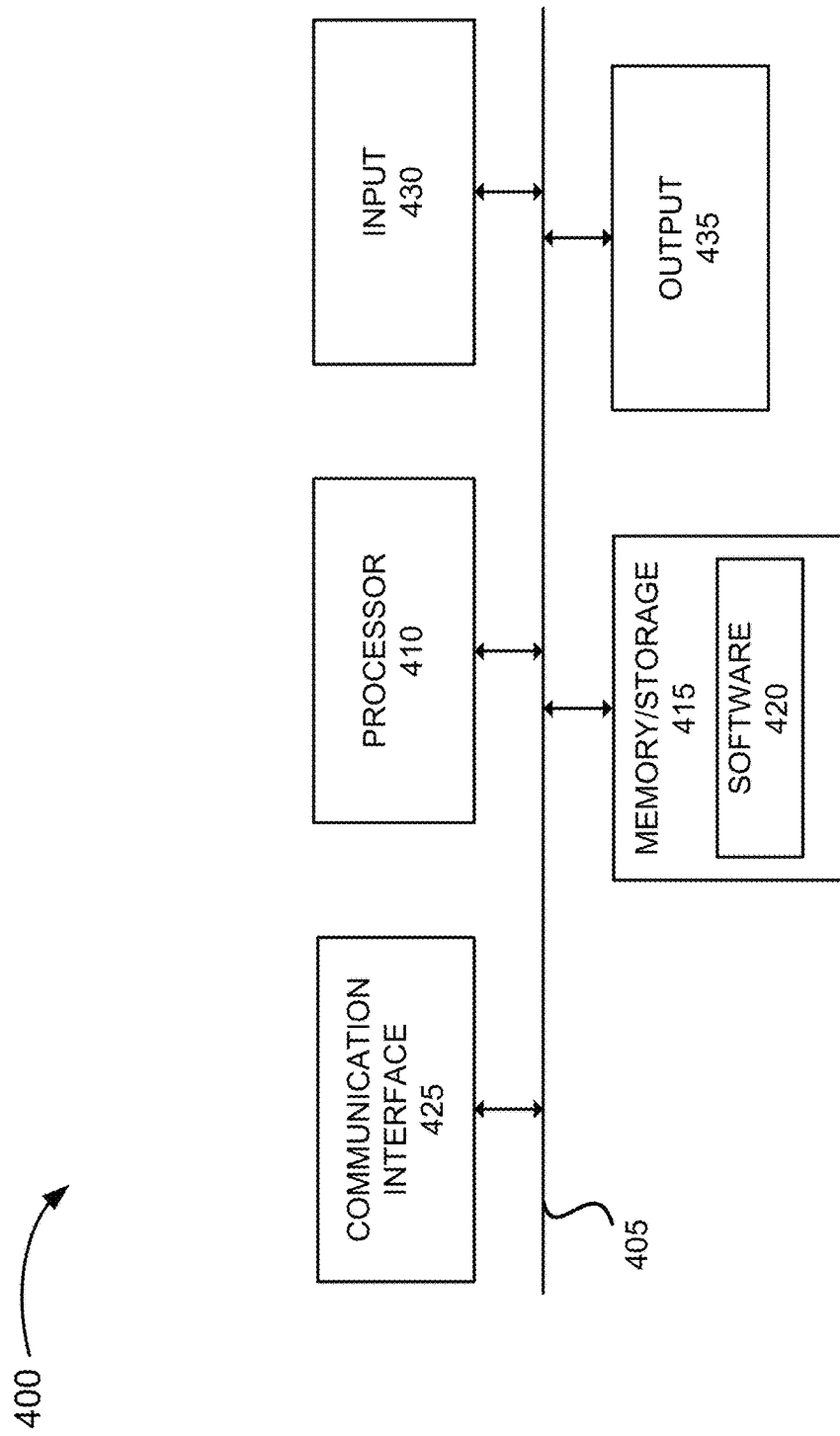

METHOD AND SYSTEM FOR TRAFFIC MANAGEMENT USING A UNIFIED NETWORK BARRING MECHANISM

REFERENCE TO RELATED APPLICATION

This patent application is a continuation of U.S. patent application Ser. No. 15/632,594 entitled "METHOD AND SYSTEM FOR TRAFFIC MANAGEMENT USING A UNIFIED NETWORK BARRING MECHANISM" filed on Jun. 26, 2017, the disclosure of which is incorporated by reference herein in its entirety.

BACKGROUND

In a network, when congestion reaches a threshold level, the network may invoke congestion control measures to protect the network from failure or shutdown.

BRIEF DESCRIPTION OF THE DRAWINGS

FIGS. 2A-2F are diagrams illustrating an exemplary process of the traffic management service;

FIG. 3A is a diagram illustrating an exemplary data structure that stores exemplary traffic management data;

FIG. 4 is a diagram illustrating exemplary components of a device that may correspond to one or more of the devices illustrated herein.

DETAILED DESCRIPTION OF PREFERRED EMBODIMENTS

Figure 1:
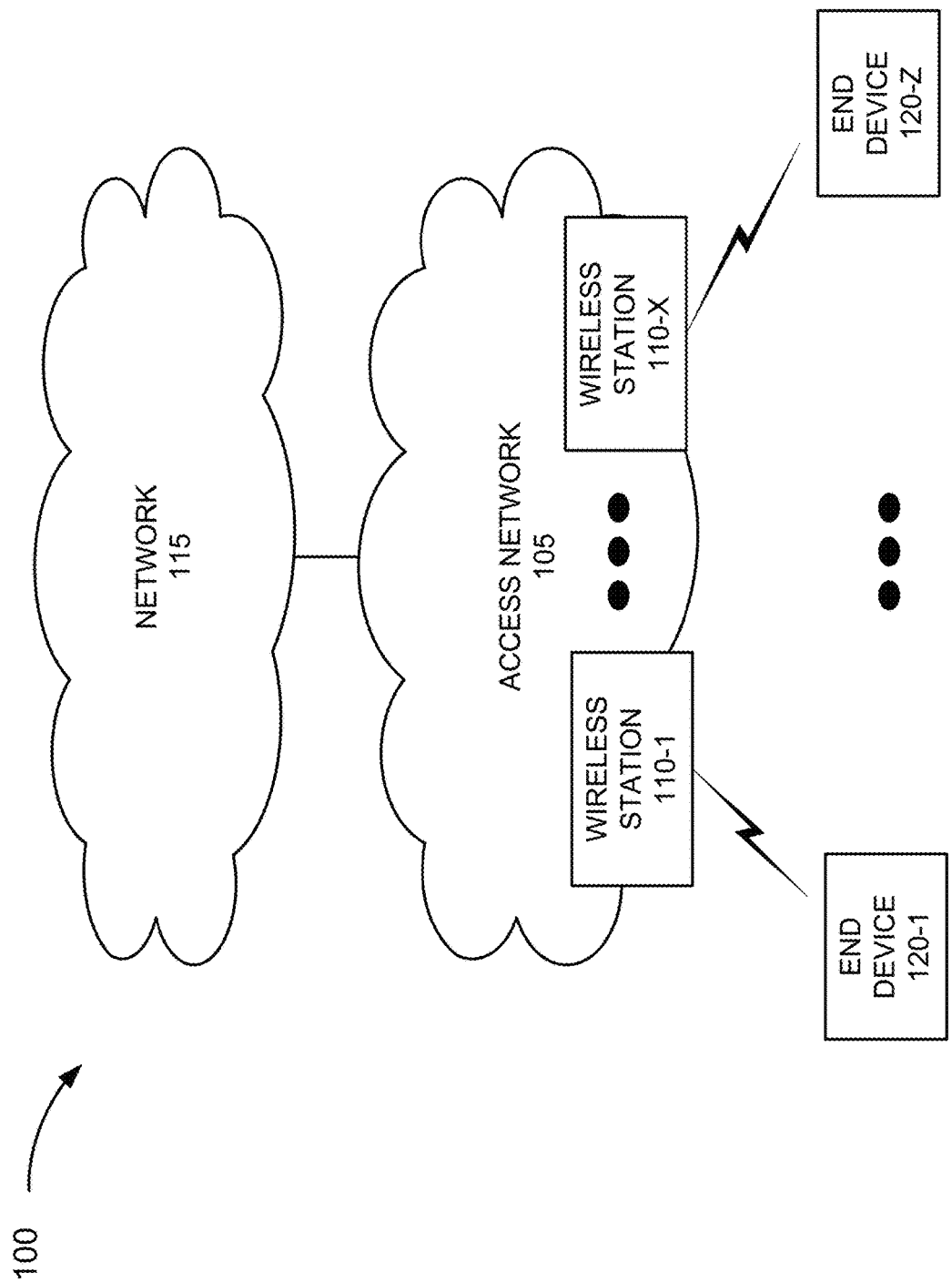
FIG. 1 is a diagram illustrating an exemplary environment in which an exemplary embodiment of a traffic management service may be implemented.

The following detailed description refers to the accompanying drawings. The same reference numbers in different drawings may identify the same or similar elements. Also, the following detailed description does not limit the invention.

There are numerous barring and congestion mechanisms that may be used for managing congestion in a network. For example, there are device-based mechanisms according to access class barring (ACB) and enhanced access barring (EAB), an application-based mechanism according to service specific access control (SSAC) (i.e., only multimedia telephony (MINITEL) applications), an application specific congestion control for data communication (ACDC) mechanism, and a user-activity-based mechanism that restricts unattended or background data traffic. These and other barring and congestion mechanisms may be defined by network administrators or under standards, such as Third Generation Partnership Project (3GPP).

While each congestion mechanism on its own may yield suitable results in view of their design, each result is limited because each congestion mechanism is not all-inclusive in terms of device and application. That is, each of the barring and congestion mechanisms may be based on hardware (e.g., device-specific, such as machine type communication (MTC)) or based on software, but not both. Thus, for network administrators, the provisioning and maintenance of disparate congestion mechanisms can be burdensome. In addition, there may be overlap in terms of devices and applications between multiple mechanisms, which can further add complexity to congestion control administration.

According to exemplary embodiments, a traffic management service in a network is described. According to an exemplary embodiment, the traffic management service provides an all-inclusive congestion control model based on type of application associated with an end device. For example, ACB, EAB, SSAC, ACDC, and user activity-based congestion control mechanisms may be unified based on a restructuring of these frameworks in view of application-based framework (i.e., a software and a hardware-based framework). According to an exemplary embodiment, a category of application may be assigned a priority class. For example, background or unattended applications may be assigned a low priority, and real-time applications may be assigned a high priority. According to an exemplary embodiment, the traffic management service correlates a congestion level to an application type or category, and further correlates the application type to a congestion control mechanism. For example, when the congestion level is low, the traffic management service may correlate the low congestion level to a low priority class of applications, and bar service requests stemming from this class of applications using the correlated congestion control mechanism. The traffic management service may use one or multiple congestion control mechanisms. According to various exemplary embodiments, the traffic management service may be implemented according to various architectures of wireless service, such as, for example, macrocell, microcell, femtocell, picocell, non-cell, or other configuration.

As a result, the traffic management service, which unifies various barring and congestion mechanisms, provides a single framework to manage congestion control for any device and any application, allowing efficient network management of a great number of devices with diverse types of applications.

FIG. 1 is a diagram illustrating an exemplary environment 100 in which an exemplary embodiment of a traffic management service may be implemented. As illustrated, environment 100 includes an access network 105 and a network 115. Access network 105 includes wireless stations 110-1 through 110-X (also referred to collectively as wireless stations 110 and, individually or generally as wireless station 110). According to other embodiments, environment 100 may include additional networks, fewer networks, and/or different types of networks than those illustrated and described herein.

Environment 100 includes communication links between the networks and between the devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

Access network 105 includes one or multiple networks of one or multiple types. For example, access network 105 may be implemented to include a terrestrial network, a wireless network and, a wired network and/or an optical network. Alternatively, for example, access network 105 may be implemented to include one or multiple other types of networks. According to an exemplary implementation, access network 105 includes a radio access network (RAN). For example, the RAN may be a Third Generation (3G) RAN, a 3.5G RAN, a Fourth Generation (4G) RAN, a 4.5G RAN, or a future generation RAN (e.g., a Fifth Generation (5G) RAN). By way of further example, access network 105 may include an Evolved UMTS Terrestrial Radio Access Network (E-UTRAN) of a Long Term Evolution (LTE) network or an LTE-Advanced (LTE-A) network, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.). Access network 105 may also include other types of networks, such as a WiFi network, a Worldwide Interoperability for Microwave Access (WiMAX) network, a local area network (LAN), a personal area network (PAN), or other type of network that provides access to or can be used as an on-ramp to access network 105 and/or network 115.

Wireless station 110 includes a network device that has computational and communication capabilities. For example, wireless station 110 may be implemented as a base station (BS), a base transceiver station (BTS), a Node B, an evolved Node B (eNB), a remote radio head (RRH), an RRH and a baseband unit (BBU), a BBU, or other type of wireless node that provides wireless access to access network 105. According to an exemplary embodiment, wireless station 110 includes logic that provides a traffic management service, as described herein.

Network 115 includes one or multiple networks of one or multiple types. According to an exemplary implementation, network 115 may include a complementary network pertaining to the one or multiple RANs described. For example, network 115 may include a core network, such as the core part of an LTE network or an LTE-Advanced network (e.g., an evolved packet core (EPC) network), a Code Division Multiple Access (CDMA) core network, a Global System for Mobile Communications (GSM) core network (e.g., a network switching subsystem (NSS)), and so forth. Depending on the implementation, network 115 may include various network devices, such as, for example, a gateway device, a support node, a serving node, a mobility management entity (MME), as well other network devices that provide various network-related functions and/or services, such as charging and billing, security, authentication and authorization, network policy enforcement, management of subscriber profiles, and/or other functions and/or services that facilitate the operation of the core network. Network 115 may also be implemented to include a service or an application-layer network, the Internet, the World Wide Web, an Internet Protocol Multimedia Subsystem (IMS) network, a Rich Communication Service (RCS) network, a cloud network, a packet-switched network, a private network, a public network, a telecommunication network, an IP network, or some combination thereof.

End device 120 includes a device that has computational and wireless communication capabilities. End device 120 may be implemented as a mobile device, a portable device, or a stationary device. End device 120 may be implemented as a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or some other type of wireless end node. By way of further example, end device 120 may be implemented as a smartphone, a personal digital assistant, a tablet, a netbook, a phablet, a wearable device, a set top box, an infotainment system in a vehicle, a smart television, a game system, a music playing system, or some other type of wireless user device. According to various exemplary embodiments, end device 120 may be configured to execute various types of software (e.g., applications, programs, etc.). The number and the types of software may vary from one end device 120 to another end device 120.

Figure 2A:
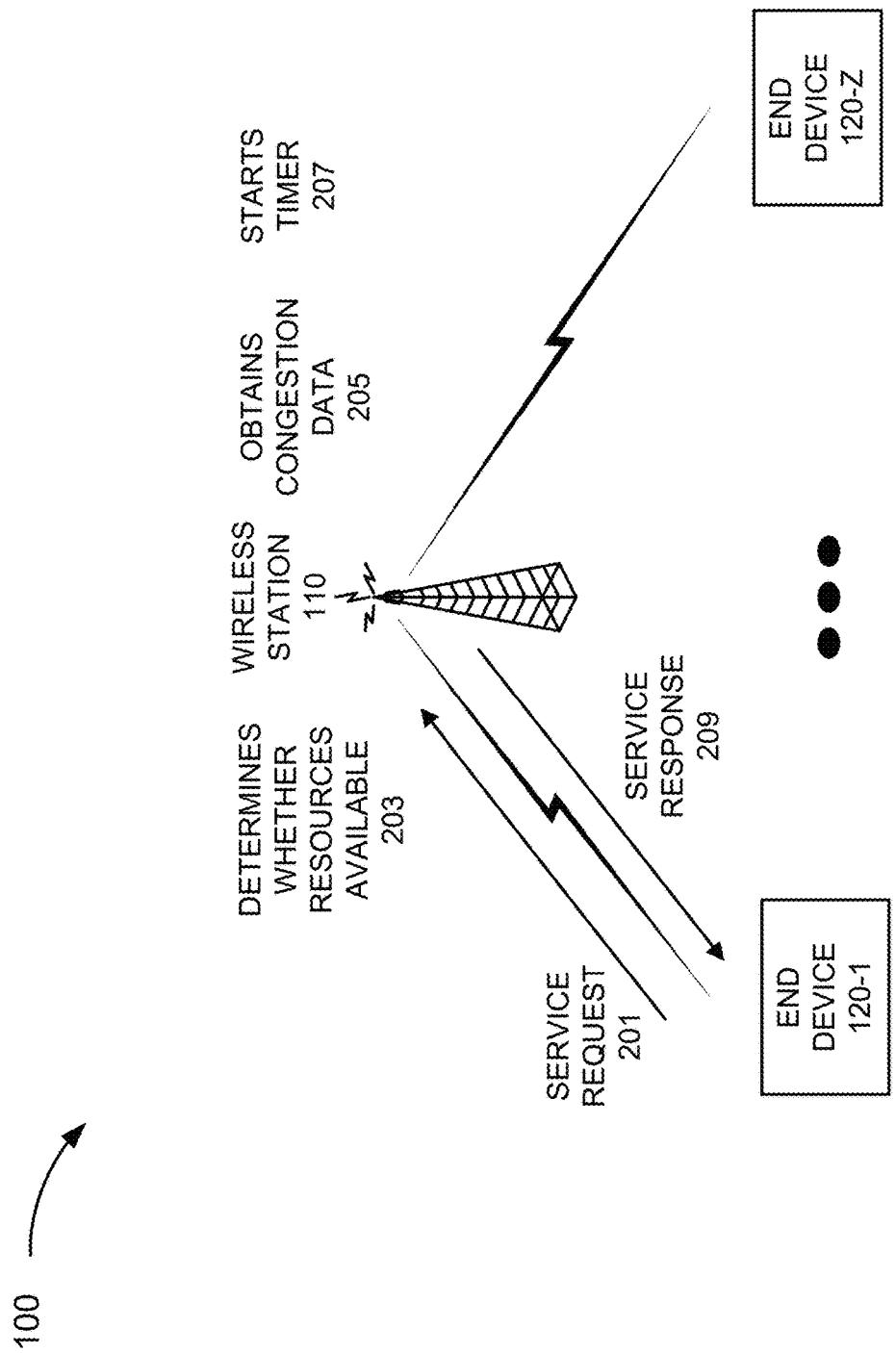

FIGS. 2A-2F are diagrams illustrating an exemplary process of the traffic management service. Referring to FIG. 2A, end device 120 may transmit a service request (201) to wireless station 110. For example, end device 120 may want to transmit data. In response to receiving the service request, wireless station 110 may determine whether resources (e.g., radio resources) are available (203) to grant the request. For example, wireless station 110 may obtain congestion data (205). The congestion data may indicate a level or a degree of congestion. As an example, wireless station 110 (or another network device (e.g., an operations, administration, and maintenance (OAM) node) (not illustrated)) may include logic to determine Key Performance Indicators (KPIs), determine resource availability versus resource load, invoke alarms, etc., based on OAM policies that pertain to congestion (e.g., air interface, core network, backhaul, or other resource) and various performance metrics (e.g., delay, packet loss, jitter, throughput, handover, dropped calls, or other type of metric (e.g., preamble collision associated with a random access procedure, etc.)).

According to this exemplary scenario, assume that congestion exists and the traffic management service is used to reduce or eliminate the congestion. Based on the congestion data and a determination that a level of congestion exists that invokes the traffic management service, wireless station 110 may start a timer (207), as illustrated. For example, a timer T1 may indicate a time period during which the congestion is to be reduced or eliminated. Additionally, as illustrated, wireless station 110 may transmit a service response (209), which denies service to end device 120 based on the state of congestion.

Referring to FIG. 2B, wireless station 110 may increment a counter (211). For example, as service requests from end devices 120 are received, the counter may tally service requests that are denied. As the counter increments in correspondence to the number of service requests denied, wireless station 110 may compare the value of the counter to a threshold value (213). As an example, wireless station 110 may select the threshold value, which corresponds to the level of congestion, based on network congestion data stored by wireless station 110. Exemplary traffic management data, which includes the network congestion data, is described further below.

Referring to FIG. 3A, an exemplary table 300 is illustrated, which stores exemplary traffic management data. As illustrated, table 300 includes a network congestion data field 305 and an end device traffic data field 310. As further illustrated, table 300 includes records 320-1 through 320-6 that each includes a grouping of fields 305 and 310 that may be correlated. The traffic management data is illustrated in tabular form merely for the sake of description. The traffic management data may be implemented in a data structure different from a table.

Network congestion data field 305 may store data pertaining to congestion and traffic management. For example, congestion data may include parameters and values indicative of a state and/or a level of congestion in the network. By way of further example, the congestion data may indicate a KPI, a performance metric (e.g., delay, throughput, etc.), a level of congestion (e.g., low, medium, high, etc.), and/or other data indicating a network condition attributable to congestion. The traffic management data may include parameters and values for reducing the congestion. For example, the traffic management data may include a time period for a timer, a percentage of end devices 120 that are to be barred, a counter threshold value, and other configuration data that may be used to provide the traffic management service, as described herein.

End device traffic data field 310 may store data that identifies an application and a type of communication. For example, end device traffic data field 310 may indicate a class of applications or a category of applications/communication. The class of application may indicate one or multiple applications, which are members of the class of application and are to be barred. A further description of end device traffic data is described in FIG. 3B.

According to other exemplary implementations, table 300 may store additional, fewer, and/or different instances of traffic management data in support of the traffic management service, as described herein. Additionally, the number of records is exemplary. According an exemplary implementation, the number of records may correspond to the number of levels of congestion. In this regard, according to other exemplary implementations, table 300 may be implemented to include fewer or additional records in correspondence to a user-configurable number of levels or states of congestion, classes of applications, or other type of data included in the traffic management data, as described herein.

Figure 3B:
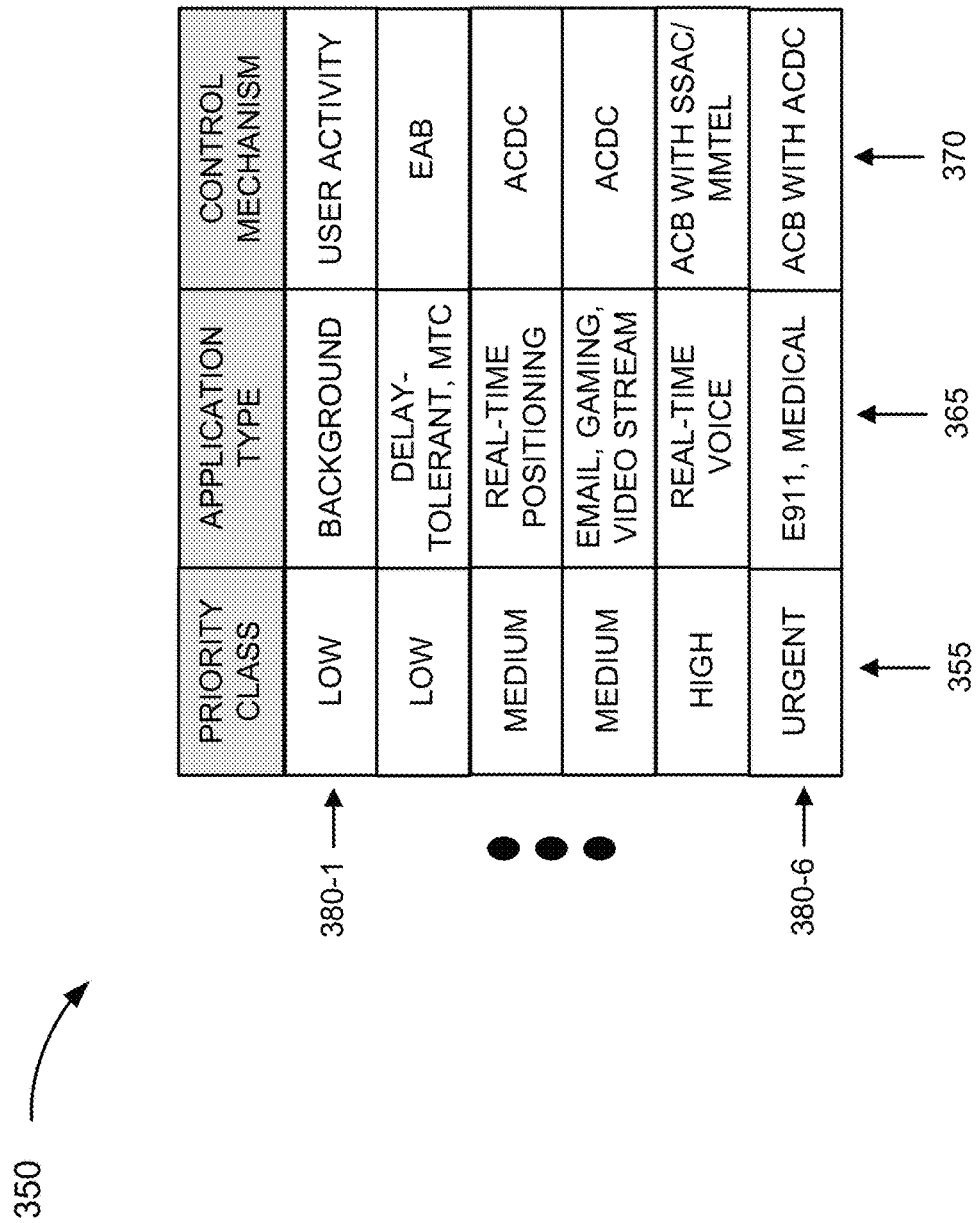
FIG. 3B is a diagram illustrating an exemplary data structure that stores exemplary end device traffic data.

FIG. 3B is a diagram illustrating exemplary end device traffic data. Referring to FIG. 3B, an exemplary table 350 is illustrated. Table 350 includes a priority class field 355, an application type field 365, and a control mechanism field 370. As further illustrated, table 350 includes records 380-1 through 380-6 that each includes a grouping of fields 355 through 370 that may be correlated. The end device traffic data is illustrated in tabular form merely for the sake of description. The end device traffic data may be implemented in a data structure different from a table (e.g., a flat file, a list, etc.), in a database, and so forth. Also, end device traffic data field 310 of table 300 may include table 350.

Priority class field 355 may store data that indicates a priority of service pertaining to a class or a category of application. For example, priority class field 355 may store data that indicates various levels of priority for service requests of different types of applications of end devices 120. As illustrated, exemplary levels of low, medium, high, and urgent are shown. According to other exemplary implementations, the number of levels and the nomenclature of the priority classes may be different. The level of priority may correlate to a level or a state of congestion. For example, a low priority class may correlate to a low congestion level.

Application type field 365 may store data that indicates one or multiple applications. For example, different categories of applications may be correlated to different priorities of service. By way of further example, as illustrated, an application may be categorized as an application that runs in the background (e.g., on end device 120), a delay-tolerant application, a machine-type communication (MTC), a real-time application, and so forth. According to other exemplary implementations, the number and the nomenclature of the application types may be different. However, according to an exemplary embodiment, application type field 365 may store all-inclusive array of various categories of applications/communications. Application type field 365 may store specific names of applications or specific devices (e.g., IoT, NB-IoT, eMTC, M2M device, etc.) that fall under a particular application type and communication or category.

Control mechanism field 370 may store data that indicates a type of congestion control mechanism. For example, according to an exemplary implementation, as illustrated, ACB, EAB, ACDC, SSAC, and user activity-based barring/congestion control mechanisms may be used in which the category of application may determine the type of congestion control mechanism used. The type of congestion control mechanism may indicate the type of message to be transmitted from wireless station 110 to end device 120 (e.g., a System Information Block (SIB) message (e.g., SIB 2, SIB 14, etc.), a control plane message, etc.), and the information carried in the message (e.g., barring of a category of application, time period for barring, etc.). When implemented, EAB and ACB mechanisms may also provide gradual barring control. For example, the percentage of end devices 120 that may be barred can range from 0% to 100%. In this way, the percentage for barring may be throttled (e.g., increased or decreased) based on the level of congestion. As an example, with reference to the high priority class, the control mechanism may include a combination of ACB with SSAC/MMTel in which a percentage of end devices 120 may be barred in relation to real-time applications (e.g., voice and video). According to another example, with reference to the urgent priority class, the control mechanism may include a combination of ACB with ACDC in which a percentage of end devices 120 may be barred in relation to any application-specific and device-specific nomenclature of software and hardware and, hardware. According to other exemplary implementations, additional, fewer, and/or different congestion control mechanisms may be implemented. For example, the traffic management service may use a single congestion control mechanism (e.g., ACB, EAB, ACDC, etc.) to control all types of applications/communications. Alternatively, other combinations of congestion control mechanisms and, application types and/or priority classes may be correlated and implemented.

According to other exemplary implementations, table 350 may store additional, fewer, and/or different instances of end device traffic data in support of the traffic management service, as described herein. The values illustrated in table 350 are exemplary, and additional, different, and/or fewer categories, levels, or types pertaining to priority of service and applications may be implemented.

Referring back to FIG. 2B, as previously described, as the counter increments the number of service requests denied, wireless station 110 may compare the value of the counter to a counter threshold value (213). As an example, wireless station 110 may select the counter threshold value that corresponds to a level of congestion based on network congestion data stored by wireless station 110. For example, wireless station 110 may use the congestion data obtained (205) to perform a look-up in table 300 (e.g., network congestion field 305) and may select a level of congestion that matches or best matches the obtained level of congestion. Wireless station 110 may select a counter threshold value, which is included in the traffic management data and correlated to the selected level of congestion. According to an exemplary implementation, the counter threshold value may indicate a maximum number of service requests to be received within a particular time period. As an example, the counter threshold value may indicate 150 service requests within 15 minutes. Based on the comparison of the incremented counter value to the counter threshold value, wireless station 110 may determine whether or not to transmit a barring message. For example, when the counter value is at least equal to the counter threshold value in view of the time period, wireless station 110 may generate and transmit a barring mechanism according to the congestion control mechanism and the level of congestion. However, when the counter value is not at least equal to or below the counter threshold value in view of the time period, wireless station 110 may continue to count the number of service requests during a specified time period.

Figure 2C:
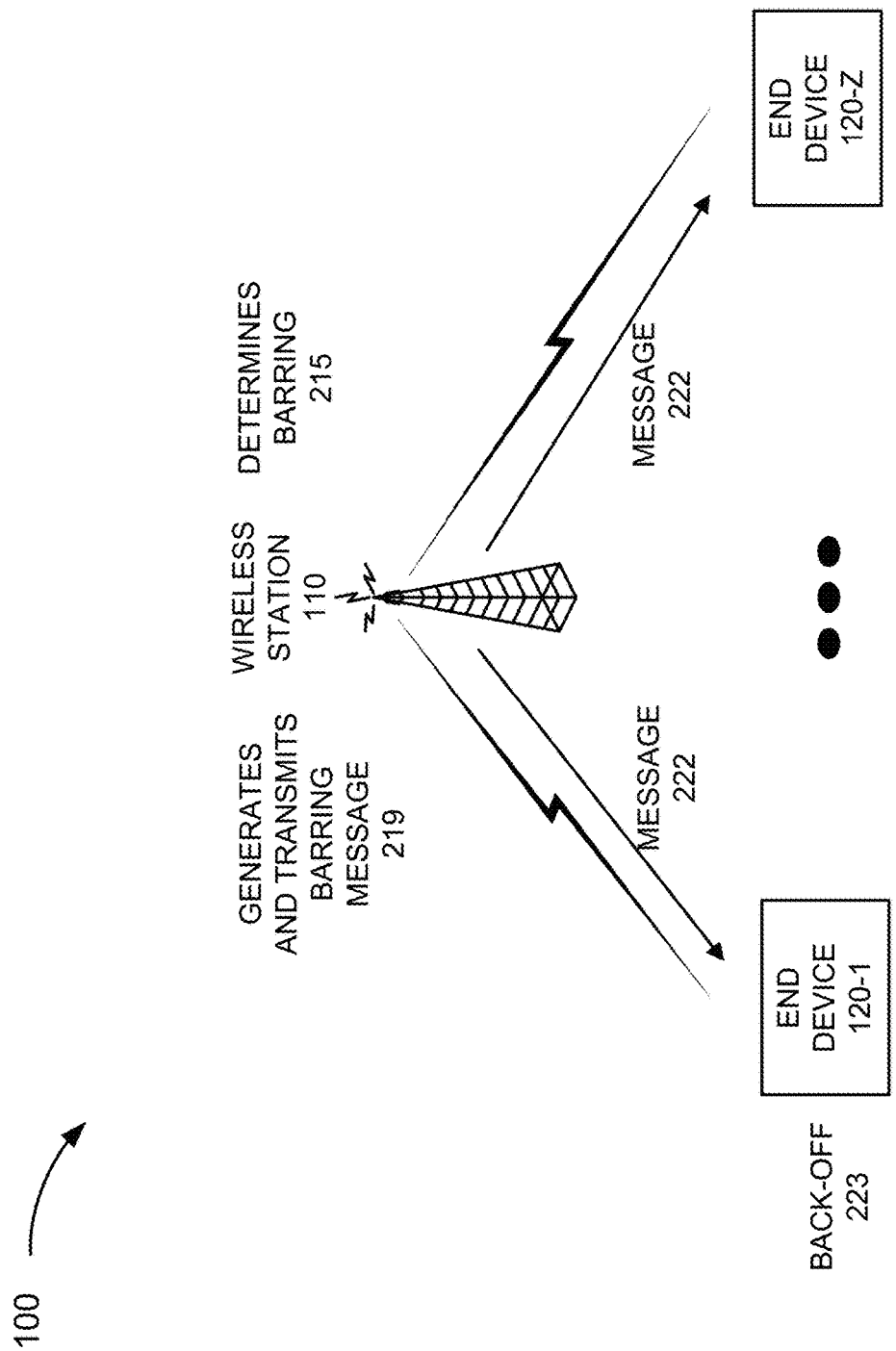

Referring to FIG. 2C, assume that wireless station 110 determines that the counter value is at least equal to the counter threshold value in view of the specified time period. In response, wireless station 110 determines barring (215) is to be used. For example, wireless station 110 may use the correlated data (e.g., the traffic management data, the end device traffic data) to determine the barring mechanism to be used and any parameters associated with the barring. According to this exemplary scenario, assume that the congestion level is correlated to a low priority. Referring to FIG. 3B, according to various exemplary implementations, wireless station 110 may use all records 380 that pertain to a low priority class for barring. That is, wireless station 110 may be configured to bar background, delay-tolerant, and MTC applications using user-activity-based and EAB mechanisms. According to other exemplary implementations, wireless station 110 may select only a portion of application-types that are correlated to the low priority class for barring. For example, wireless station 110 may be configured to bar delay-tolerant and/or MTC applications. Additionally, or alternatively, according to other exemplary implementations, wireless station 110 may be configured to bar a particular application type, which is correlated to the low priority class, based on the number and type of service requests being received and counted (e.g., MTC application versus background application). As an example, wireless station 110 may have received more service requests associated with delay-tolerant and/or MTC applications versus background applications. According to an exemplary implementation, wireless station 110 may select delay-tolerant and/or MTC applications to bar and not bar background applications. Alternatively, according to another exemplary implementation, wireless station 110 may bar background, delay-tolerant, and MTC applications, and the percentage of end devices 120 barred in relation to delay-tolerant and MTC applications, is calculated based on the percentage of service requests received during the counting procedure. For example, assume that the total percentage for barring is 20%, wireless station 110 may calculate what percentage or portion of the 20% the delay-tolerant application(s) and the MTC are to be barred.

Figure 2D:
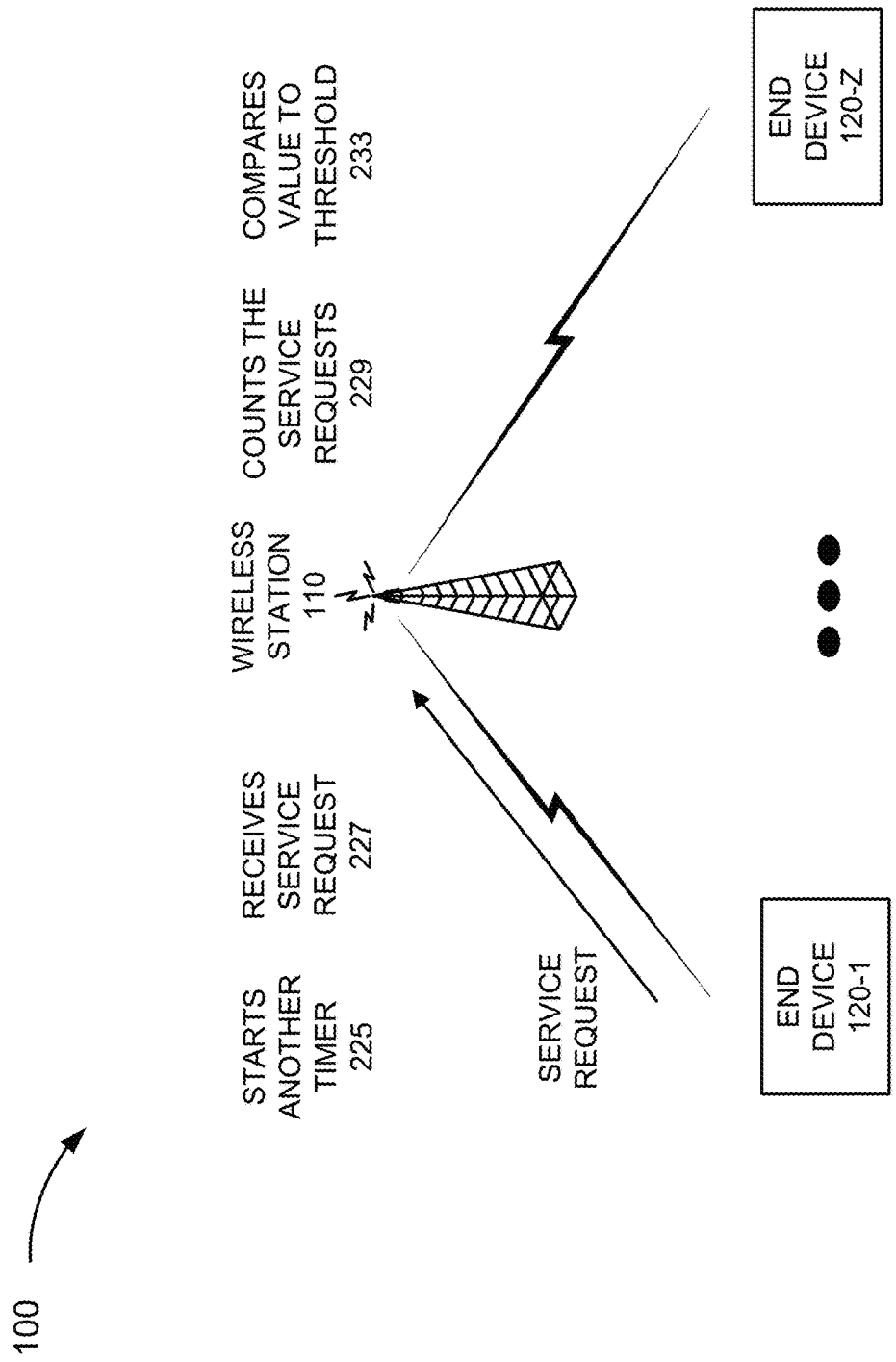
Figure 2F:
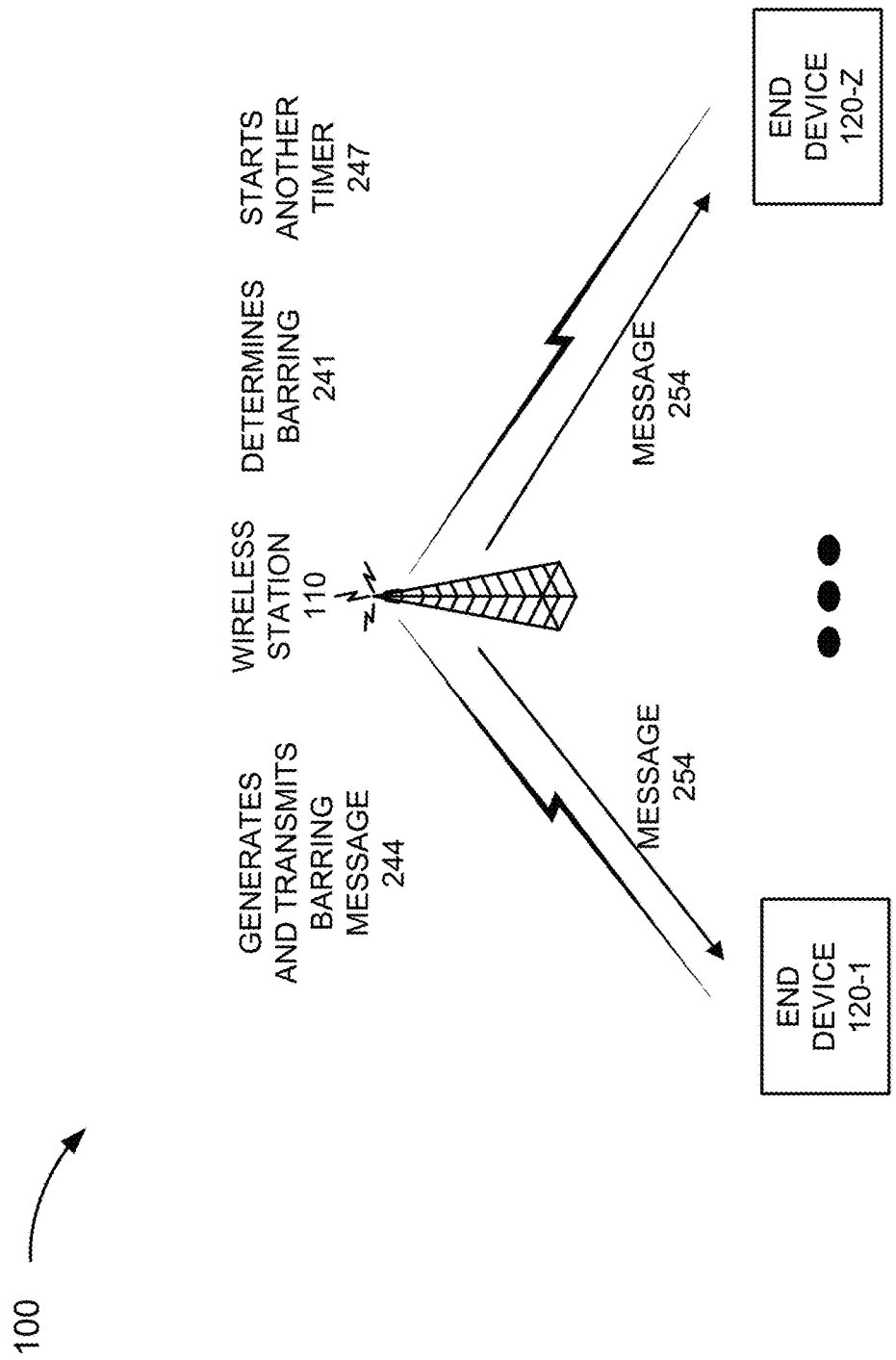

According to this exemplary scenario, assume wireless station 110 selects the EAB mechanism and determines to bar a percentage of end devices 120 and delay-tolerant/MTC applications. Wireless station 110 may select a percentage of end devices 120 to bar based on the traffic management data stored in table 300. For example, the traffic management data may indicate to bar 10% (or some other percentage) of end devices 120. According to an exemplary embodiment, wireless station 110 may randomly select the end devices 120 to bar. For example, wireless station 110 may randomly select 10% of all end devices 120 that are in a cell serviced by wireless station 110. As further illustrated in FIG. 2C, wireless station 110 may generate and transmit a barring message (219) to end devices 120 in accordance with the barring parameters. As an example, wireless station 110 may transmit a barring message (222). In response to receiving the barring message, 10% of end devices 120 may start a back-off in which service requests associated with delay-tolerant/MTC applications are barred. Additionally, the traffic management data stored by wireless station 110 may include data indicating the back-off time period. For example, as illustrated in FIG. 2D, wireless station 110 may start another timer (225) to track the duration of the back-off time period used by end devices 120. Wireless station 110 may also restart the counter for counting service requests received during the back-off time period.

During the back-off time period, wireless station 110 may continue to receive service requests (227) from end devices 120. Wireless station 110 may count the number of service requests (229) during the back-off time period. Wireless station 110 may compare the number of service requests to a counter threshold value (233). For example, the counter threshold value may indicate a maximum number of service requests to be received within the time period. The time period may be equivalent to the back-off period. According to an exemplary implementation, wireless station 110 may compare the number of service requests to the counter threshold value in response to the expiration of the back-off time period. According to another exemplary implementation, wireless station 110 may compare the number of service requests to the threshold value before the expiration of the back-off time period.

Based on the result of the comparison, wireless station 110 may or may not transmit another barring message. For example, when the counted number of service requests are below the threshold value, wireless station 110 may decrease the barring measures. For example, referring to FIG. 2E, wireless station 110 may determine whether there will be further barring (236). As an example, if the percentage of end devices 120 barred was at 10%, wireless station 110 may reduce the percentage to 0% and stop the timer (239) that was started and previously described in FIG. 2A (e.g., start timer (207)). According to another example, the decrease in barring measures may include selecting a lower priority of service application to bar (e.g., from real-time positioning applications to delay-tolerant applications) or a different type of application having the same priority class (e.g., from delay tolerant/MTC applications to background applications). For example, wireless station 110 may bar applications having a lower priority class (e.g., e-mail and gaming) compared to the priority class of applications (e.g., real-time voice) that were barred during the back-off period.

According to another example, when the counted number of service requests are above the threshold value, wireless station 110 may increase the barring measures. That is, the increase in barring measures may include increasing the percentage of end devices 120 to be barred, selecting a higher class of priority applications to bar, selecting additional applications to bar within the same priority class, selecting multiple priority classes and/or multiple categories of applications, or some combination thereof. For example, referring to FIG. 2F, when wireless station 110 determines that the threshold value is not greater than the number of service requests received, wireless station 110 may determine the barring (241) to be used, generate and transmit a barring message (244) to end devices 120, and start another timer (247) that tracks the duration of the back-off period. Depending on the barring mechanism, priority class, and/or application type, wireless station 110 may increase the percentage of randomly selected end devices 120 to bar. For example, according to the exemplary scenario described, wireless station 110 may increase the percentage from 10% to 20%, and include both background applications and delay-tolerant/MTC applications. Wireless station 110 may calculate the percentage based on the type of service requests receiving during the back-off time period, as previously described. In a manner similar to that previously described, barring message 254 may be received by end devices 120 and a back-off period pertaining to 20% of end devices 120 may begin. The traffic management service may continue to be performed by wireless station 110, in accordance with operations described herein, until the congestion is reduced or eliminated.

Although FIGS. 2A-2F illustrate an exemplary process of the traffic management service, according to other exemplary embodiments, additional, fewer, and/or different operations of the traffic management service may be performed.

FIG. 4 is a diagram illustrating exemplary components of a device 400 that may correspond to one or more of the devices described herein. For example, device 400 may correspond to components included in wireless station 110 and end device 120. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.) and a corresponding drive. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to wireless station 110, software 420 may include an application that, when executed by processor 410, provides the functions of the traffic management service, as described herein. Similarly, end device 120 may include an application that, when executed by processor 410, provides the functions of the traffic management service, as described herein. Software 420 may also include firmware, middleware, microcode, hardware description language (HDL), and/or other form of instruction.

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
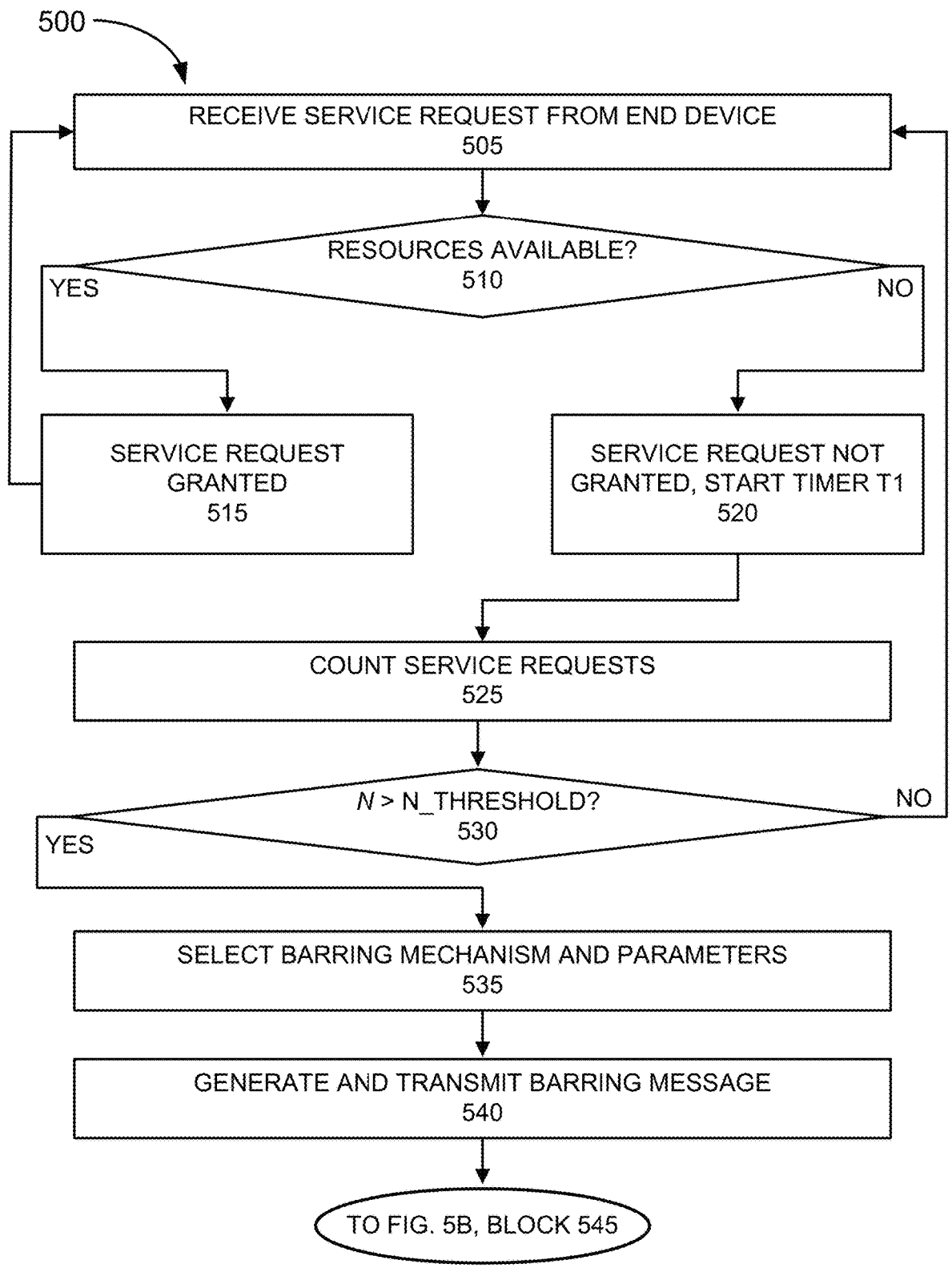
FIGS. 5A and 5B are flow diagrams illustrating an exemplary process of an exemplary embodiment of the traffic management service.
Figure 5B:
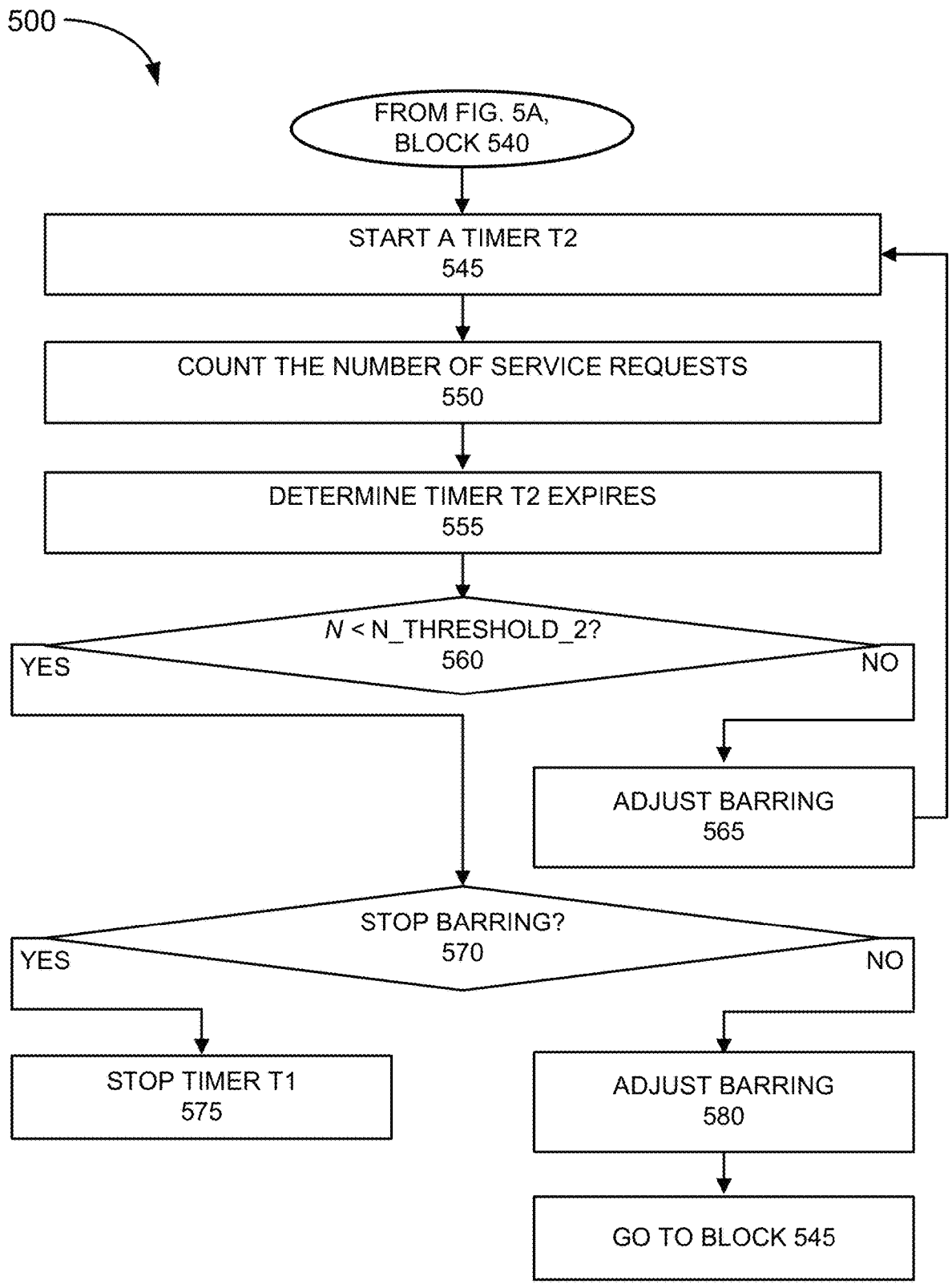

FIGS. 5A and 5B are flow diagrams illustrating an exemplary process 500 of an exemplary embodiment of the traffic management service. Process 500 is directed to a process previously described with respect to FIGS. 2A-2F, as well as elsewhere in this description, in which a traffic management service is provided. According to an exemplary embodiment, wireless station 110 performs steps of process 500. For example, processor 410 executes software 420 to perform the steps illustrated in FIGS. 5A and 5B, and described herein.

Referring to FIG. 5A, in block 505 of process 500, a service request is received from an end device. For example, wireless station 110 may receive a service request from end device 120. By way of further example, end device 120 may transmit a request for radio resources in order to transmit data.

In block 510, it is determined whether resources are available. For example, wireless station 110 may determine whether resources are available to service the request based on congestion data. The congestion data may indicate a level or a degree of congestion. Depending on the level of congestion, wireless station 110 may grant or deny the service request.

When it is determined that the resources are available (block 510—YES), the service request is granted (block 515). For example, wireless station 110 may allocate and schedule resources for end device 120 to use, and transmit a message, which indicates that the service request is granted, to end device 120. When it is determined that the resources are not available (block 510-NO), the service request is not granted (block 520). For example, wireless station 110 may transmit a message, which indicates that the service request is not granted, to end device 120. Additionally, in response to this determination, wireless station 110 may start a timer (e.g., timer T1).

In block 525, service requests are counted. For example, wireless station 110 may count the number of service requests received from end devices 120. As an example, wireless station 110 may increment a counter for each service request received.

In block 530, it is determined whether the number of service requests is greater than a threshold value. For example, wireless station 110 may select a threshold value based on traffic management data stored by wireless station 110. Wireless station 110 may compare the counted value to the threshold value to determine whether the number of service requests is greater than the threshold value. Additionally, as previously described, the threshold value may include a time period associated with a value indicating a number of service requests (e.g., 100 service requests/15 minutes, etc.).

When it is determined that the number of service requests is not greater than the threshold value (block 530-NO), process 500 may return to block 505. When it is determined that the number of service requests is greater than the threshold value (block 530—YES), a barring mechanism and parameters are selected (block 535). For example, wireless station 110 may determine the barring mechanism to be used (e.g., ACB, EAB, etc.) and any parameters associated with the barring (e.g., percentage of end devices 120 to bar, the type of applications to bar, the time period of the back-off period, etc.) based on the traffic management data, as previously described.

In block 540, a barring message is generated and transmitted. For example, based on the selection of the barring mechanism and parameters, wireless station 110 may generate and transmit a barring message to end devices 120 that reside in a cell serviced by wireless station 110. The barring message may be implemented as a SIB message.

Referring to FIG. 5B, in block 545, another timer is started. For example, wireless station 110 may start another timer (e.g., a timer T2) in response to the transmission of the barring message. Timer T2 may track the duration of the back-off period of end devices 120 to which the barring message pertains.

Referring to FIG. 5B, in block 550, the number of service requests may be counted. For example, wireless station 110 may count the number of service requests received during the back-off period.

In block 555, the timer T2 expires. For example, wireless station 110 may determine when the back-off period expires based on the timer T2. In block 560, in response to the expiration of the back-off period, it is determined whether the number of counted service requests is greater than a threshold value. For example, wireless stations 110 may select the threshold value from the traffic management data correlated to the barring mechanism and parameters, the level of congestion, the applications barred, and so forth, as previously described. Wireless station 110 may compare the number of counted service requests (and associated time period) with the threshold value.

When it is determined that the threshold value is not greater than the counted service requests (block 560-NO), barring is adjusted (block 565). For example, wireless station 110 may increase the barring measures, as previously described. By way of further example, wireless station 110 may increase the percentage of end devices 120 barred, select a different set of applications to be barred (e.g., of the same priority class, higher priority class), select a different back-off time period, select a different threshold value to compare the counted service requests, select the barring mechanism to use, and so forth. Wireless station 110 may transmit the barring message to end devices 120 in accordance with the increase of barring measures. As further illustrated, process 500 may return to block 545.

When it is determined that the threshold value is greater than the counted service requests (block 560—YES), it is determined whether to stop the barring of end devices (block 570). For example, wireless station 110 may determine whether to stop the barring of end devices 120 or reduce or decrease the barring measures directed to end devices 120. According to an exemplary implementation, when ACB and EAB barring mechanisms are used, wireless station 110 may calculate the decrease in the percentage of end devices 120 to bar. For example, an exemplary expression such as $x=x-\Delta x$ may be used to calculate the reduced percentage value. According to such an implementation, the value of x may indicate the current percentage and $\Delta x$ may indicate the percentage to reduce. Thus, depending on the respective values configured, wireless station 110 may determine whether to stop the barring of end devices 120. For example, according to the exemplary scenario previously described, when the current percentage may be 10%, and $\Delta x$ may be 10%, the result would yield 0% (0=10−10). In such a case, wireless station 110 may determine to stop the barring of end devices 120, and stop timer T1 (block 575). For example, the traffic management service may be suspended because the congestion has been reduced to acceptable level or eliminated.

However, according to another example, when the current percentage may be 40% and $\Delta x$ may be 10%, the result would yield 30% (30=40−10). In this case, wireless station 110 may continue to adjust the barring measures (block 580) by decreasing the barring measures. For example, according to the scenario just described, wireless station 110 may randomly select 30% of end devices 120, and may make other adjusts in terms of the set of applications to be barred (e.g., of the same priority class, lower priority class), select a different back-off time period, select a different threshold value to compare the counted service requests, select the barring mechanism to use, and so forth. Wireless station 110 may transmit the barring message to end devices 120 in accordance with the decrease of barring measures. As further illustrated, process 500 may return to block 545.

According to other exemplary implementations, when ACB and/or EAB is not the congestion control mechanism used, the decrease of barring measures may be implemented by selecting a different set of applications to be barred (e.g., of the same priority class, lower priority class), select a different back-off time period, and so forth.

Although FIGS. 5A and 5B illustrate an exemplary process 500 of the traffic management service, according to other embodiments, process 500 may include additional operations, fewer operations, and/or different operations than those illustrated in FIGS. 5A and 5B, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. As an example, according to other exemplary embodiment, the traffic management service may use additional, different, and/or fewer congestion control mechanisms than those described herein. Additionally, or alternatively, according to other exemplary embodiments, the correlations to the congestion control mechanisms may be different in terms of priority class, application type, communication type, and so forth. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   storing, by a network device, traffic management data that indicates levels of congestion, categories of applications associated with end devices, types of congestion mechanisms, and barring parameters;
   receiving, by the network device, a request for wireless service from one of the end devices;
   determining, by the network device, that the request cannot be granted based on a level of congestion;
   selecting, by the network device, one of the levels of congestion and correlated first category of application, first type of congestion mechanism, and first barring parameters included in the traffic management data;
   transmitting, by the network device, a first barring message to the end devices;
   starting, by the network device, a timer that provides a back-off period;

counting, by the network device, service requests received during the timer; and determining, by the network device at an end of the timer, whether a number of the counted service requests is less than a threshold value of the first barring parameters.

2. The method of claim 1, wherein, when the counted service requests are less than the threshold value, the method further comprises:

selecting, by the network device, an other one of the levels of congestion and correlated second category of application, second type of congestion mechanism, and second barring parameters, wherein the second category of application has a lower class of priority relative to the first category of application.

3. The method of claim 2, wherein the selecting of the other one of the levels of congestion is further based on a category of application associated with the service requests.

4. The method of claim 1, wherein the network device is an evolved Node B, a next generation Node B, or a base station of a radio access network.

5. The method of claim 1, wherein, when the counted service requests are greater than the threshold value, the method further comprises:

selecting, by the network device, an other one of the levels of congestion and correlated second category of application, second type of congestion mechanism, and second barring parameters, wherein the second category of application has a higher class of priority relative to the first category of application.

6. The method of claim 5, wherein, when the second type of congestion mechanism is access class barring or enhanced access class barring, the method further comprises:

calculating, by the network device, a percentage of the end devices to which barring pertains, wherein the percentage is increased relative to barring of the first barring message.

7. The method of claim 6, further comprising:

generating, by the network device, a second barring message based on the second type of congestion mechanism, the second barring parameters, the percentage, and the second category of application correlated to the other one of the levels of congestion; and transmitting, by the network device, the second barring message to the end devices.

8. The method of claim 1, wherein each different category of application included in the traffic management data is correlated to a priority class, and wherein the priority class is further correlated to one of the levels of congestion.

9. A network device comprising:

a communication interface; and a processor, wherein the processor is configured to:

store traffic management data that indicates levels of congestion, categories of applications associated with end devices, types of congestion mechanisms, and barring parameters;

receive, via the communication interface, a request for wireless service from one of the end devices;

determine that the request cannot be granted based on a level of congestion;

select one of the levels of congestion and correlated first category of application, first type of congestion mechanism, and first barring parameters included in the traffic management data;

transmit, via the communication interface, a first barring message to the end devices;

start a timer that provides a first back-off period;

count service requests received during the timer; and determine at an end of the timer, whether a number of the counted service requests is less than a threshold value of the first barring parameters.

10. The network device of claim 9, wherein, when the counted service requests are less than the threshold value, the processor is further configured to:

select an other one of the levels of congestion and correlated second category of application, second type of congestion mechanism, and second barring parameters, wherein the second category of application has a lower class of priority relative to the first category of application.

11. The network device of claim 10, wherein, when selecting the other one of the levels of congestion, the processor is further configured to:

select the other one of the levels of congestion is further based on a category of application associated with the service requests.

12. The network device of claim 9, wherein the network device is an evolved Node B, a next generation Node B, or a base station of a radio access network.

13. The network device of claim 9, wherein when the counted service requests are greater than the threshold value, the processor is further configured to:

select an other one of the levels of congestion and correlated second category of application, second type of congestion mechanism, and second barring parameters, wherein the second category of application has a higher class of priority relative to the first category of application.

14. The network device of claim 13, wherein when the second type of congestion mechanism is access class barring or enhanced access class barring, the processor is further configured to:

calculate a percentage of the end devices to which barring pertains, wherein the percentage is increased relative to barring of the first barring message.

15. The network device of claim 14, wherein the processor is further configured to:

generate a second barring message based on the second type of congestion mechanism, the second barring parameters, the percentage, and the second category of application correlated to the other one of the levels of congestion; and transmit, via the communication interface, the second barring message to the end devices.

16. A non-transitory computer-readable storage medium storing instructions executable by a processor of a device, which when executed cause the device to:

store traffic management data that indicates levels of congestion, categories of applications associated with end devices, types of congestion mechanisms, and barring parameters;

receive a request for wireless service from one of the end devices;

determine that the request cannot be granted based on a level of congestion;

select one of the levels of congestion and correlated first category of application, first type of congestion mechanism, and first barring parameters included in the traffic management data;

transmit a first barring message to the end devices;

start a timer that provides a first back-off period;

count service requests received during the timer; and determine at an end of the timer, whether a number of the counted service requests is less than a threshold value of the first barring parameters.

17. The non-transitory computer-readable storage medium of claim 16, further storing instructions executable by the processor of the device, which when executed cause the device to:

wherein when the counted service requests are less than the threshold value, select an other one of the levels of congestion and correlated second category of application, second type of congestion mechanism, and second barring parameters, wherein the second category of application has a lower class of priority relative to the first category of application.

18. The non-transitory computer-readable storage medium of claim 17, wherein the instructions further include instructions executable by the processor of the device, which when executed cause the device to:

wherein when the counted service requests are greater than the threshold value, select an other one of the levels of congestion and correlated second category of application, second type of congestion mechanism, and second barring parameters, wherein the second category of application has a higher class of priority relative to the first category of application.

19. The non-transitory computer-readable storage medium of claim 18, wherein the instructions further include instructions executable by the processor of the device, which when executed cause the device to:

wherein when the second type of congestion mechanism is access class barring or enhanced access class barring, calculate a percentage of the end devices to which barring pertains, wherein the percentage is increased relative to barring of the first barring message.

20. The non-transitory computer-readable storage medium of claim 19, wherein the instructions further include instructions executable by the processor of the device, which when executed cause the device to:

generate a second barring message based on the second type of congestion mechanism, the second barring parameters, the percentage, and the second category of application correlated to the other one of the levels of congestion; and transmit the second barring message to the end devices.

* * * * *